US011526502B1

(12) United States Patent
Harris et al.

(10) Patent No.: US 11,526,502 B1
(45) Date of Patent: Dec. 13, 2022

(54) PARAMETERIZED DISJOINT SAMPLES OF DATA SETS

(71) Applicant: Amazon Technologies, Inc., Seattle, WA (US)

(72) Inventors: Timothy Lawrence Harris, Cambridge (GB); Thomas Albert Faulhaber, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 458 days.

(21) Appl. No.: 16/583,158

(22) Filed: Sep. 25, 2019

(51) Int. Cl.
| | |
|---|---|
| *G06F 16/30* | (2019.01) |
| *G06F 16/242* | (2019.01) |
| *G06F 16/25* | (2019.01) |
| *G06F 16/28* | (2019.01) |
| *G06N 20/00* | (2019.01) |
| *G06F 7/58* | (2006.01) |

(52) U.S. Cl.
CPC ........ *G06F 16/2423* (2019.01); *G06F 16/252* (2019.01); *G06F 16/284* (2019.01); *G06N 20/00* (2019.01); *G06F 7/582* (2013.01)

(58) Field of Classification Search
CPC .. G06F 16/2423; G06F 16/284; G06F 16/252; G06F 16/21; G06F 16/6218; G06F 16/288
USPC ........ 707/609, 687, 705, 769, 790, 813, 821
See application file for complete search history.

(56) References Cited

U.S. PATENT DOCUMENTS

| | | | |
|---|---|---|---|
| 10,650,313 B2* | 5/2020 | Ackerman | G06N 5/022 |
| 2015/0149491 A1* | 5/2015 | Redlich | H04L 67/1097 |
| | | | 707/755 |
| 2018/0075107 A1* | 3/2018 | Park | G06F 16/278 |

OTHER PUBLICATIONS

U.S. Appl. No. 14/460,314, filed Aug. 14, 2014, Leo Parker Dirac.
U.S. Appl. No. 15/952,787, filed Apr. 13, 2018, Douglas Stewart Laurence.
U.S. Appl. No. 15/952,793, filed Apr. 13, 2018, Ning Liao.
U.S. Appl. No. 15/952,806, filed Apr. 13, 2018, Douglas Stewart Laurence.
AWS, "Amazon SageMaker Features", Retrieved from https://aws.amazon.com/sagemaker/features/, Aug. 14, 2019, 7 Pages.
AWS, "S3 Select and Glacier Select—Retrieving Subsets on Objects", Retrieved from https://aws.amazon.com/blogs/aws/s3-glacier-select/, Jul. 16, 2019, 8 Pages.
Unknown, "TableSample—Basic Examples—Notes on SQL", Retrieved from https://sqlrambling.net/2018/01/24/tablesample-basic-examples/, Jul. 16, 2019, 4 Pages.

\* cited by examiner

*Primary Examiner* — Sana A Al-Hashemi
(74) *Attorney, Agent, or Firm* — Robert C. Kowert; Kowert, Hood, Munyon, Rankin & Goetzel, P.C.

(57) ABSTRACT

A filter request for a data set indicates a query specification and one or more sub-range indicators of a disjoint subset descriptor. Corresponding the individual data records obtained from the data set using the query specification, a respective range mapping value is generated. Using the range mapping values and the sub-range indicators, a result set of the filter request is obtained.

20 Claims, 10 Drawing Sheets

PARAMETERIZED DISJOINT SAMPLES OF DATA SETS

BACKGROUND

In recent years, network-accessible storage services are increasingly being used to store very large data sets, such as data collected from numerous types of environmental sensors, data generated as a result of financial transactions, and so on. A number of analytics applications, including machine learning and other artificial intelligence applications, may require access to large volumes of such data. In some cases, as in supervised learning techniques, machine learning models may have to be trained using large labeled data sets. Some so-called "deep-learning" models may, for example, require tens of millions, or even hundreds of millions, of labeled example records to achieve desired quality levels. Often, a machine learning model may undergo numerous iterations of training and tuning, with meta-parameters being adjusted or tuned between such iterations. A trained version of a model, produced in such an iteration, may then be tested or evaluated using yet another data set. To evaluate the generalizability of the model, the data set used for testing should not overlap with the data set used for training; otherwise, if for example a large section of the test data set was also used to train the model earlier, the results of the testing are likely to be skewed positively and provide little insight into the generalizability or overall quality of the model.

Organizations that store large data sets at network-accessible services may wish to extract subsets or samples of the data for a number of reasons, e.g., to experiment with respective machine learning algorithms or to try out different meta-parameters for the same machine learning algorithm. In some cases, the data sets may be stored at high-performance storage services in the form of unstructured objects accessible via web-services interfaces, with each object potentially comprising numerous example records. Individual records may have to be extracted from the unstructured objects before analytics tasks can commence. Furthermore, for many use cases, only a subset of the content of millions of records of a very large data set may have to be processed for a given analytics application, so extracting the subset close to where the data set is physically stored may be beneficial.

Figure 1:
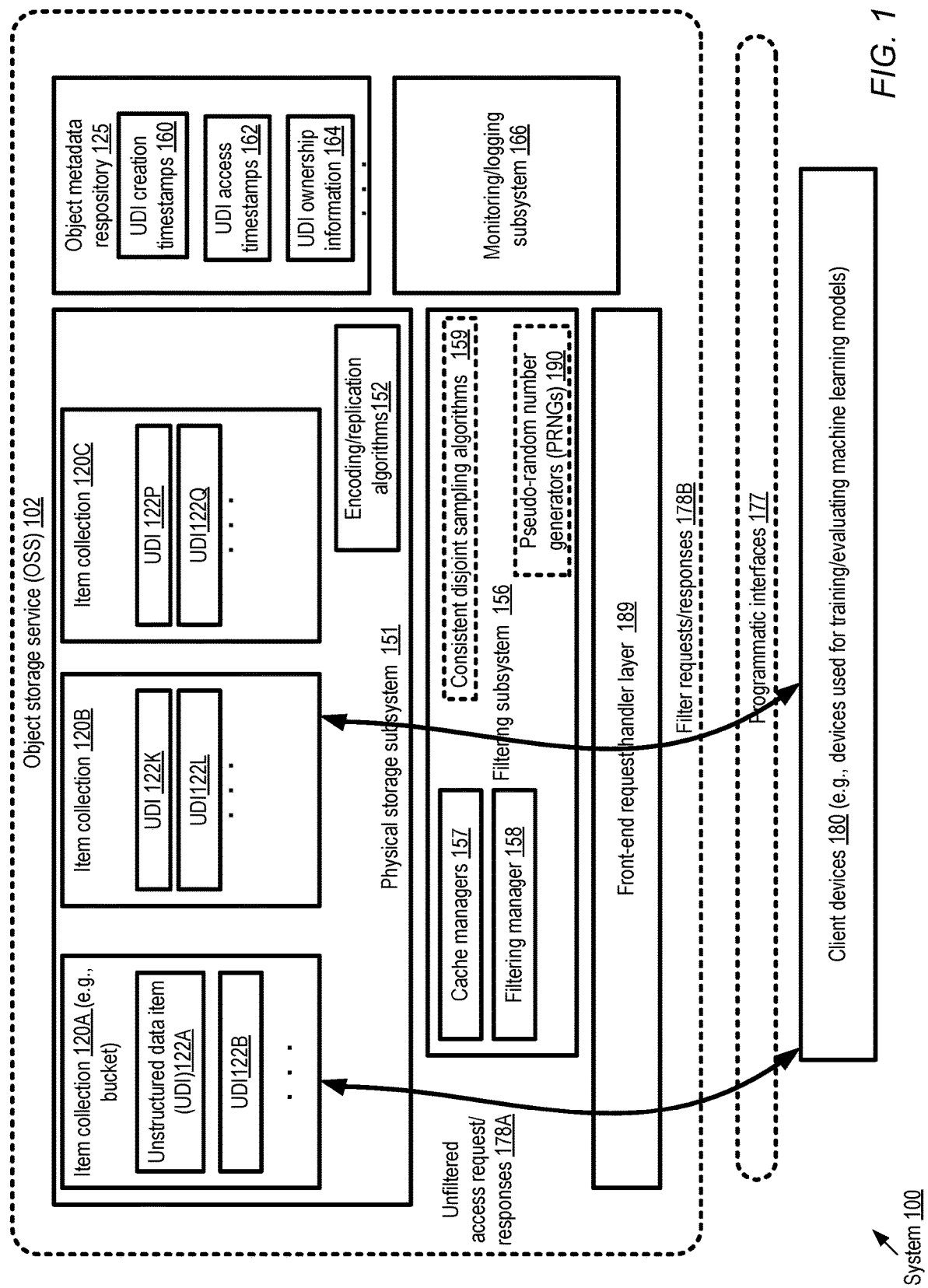
FIG. 1 illustrates an example system environment in which consistent disjoint sampling algorithms may be implemented for large data sets at a filtering subsystem of an object storage service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing parametrized consistent disjoint subsets of large data sets from network-accessible storage services are described. Clients of such services may store their data sets in any of a variety of formats at the storage services in different embodiments. The clients may then programmatically specify, e.g., in a filter request access request, a combination of logical criteria and sampling criteria to be used to extract desired subsets of the data set at the service in a consistent and repeatable manner, and provide only the extracted subsets to the clients. In some cases, a first subset of the data set may first be identified based on client-specified logical or semantic criteria, and then the first subset may be further reduced based on client-specified sampling criteria before the final result is provided to the client. The sampling parameters provided by the client, which may be referred to as disjoint subset descriptors in some embodiments, may be re-used, if desired, to obtain the identical result set, even though pseudo-random numbers may be used internally at the service for at least some aspects of the sampling. Furthermore, the storage service may implement programmatic interfaces with easy-too-use request syntax that allows clients to precisely control, at any desired granularity, the manner in which the logical subset of the data set is to be mapped into particular subsets—e.g., if the client desires that the logical subset is to be further subdivided into N non-overlapping subsets which collectively form the entire data set, the service may generate N such subsets.

In some embodiments, the data sets may be stored as unstructured objects—that is, at the time that a given object is stored on behalf of a client, the service need not be informed regarding how that object is to be interpreted or partitioned into records, how a given record is to be subdivided into fields or columns, and so on. In other embodiments, the data set may be stored as a collection of one or more relational or non-relational database tables rather than as unstructured objects, or the data set may be stored in a heterogeneous collection of objects such as files, tables, unstructured byte collections, and the like. If at least a subset of a given data set is stored in unstructured form, the responsibilities of the storage service may include imposing structure on the raw data, e.g., using client-supplied delimiters, schemas or other approaches, before applying the client-specified logical and sampling criteria. In some embodiments, clients may not have to specify descriptors; instead, the storage service may infer the delimiters (based for example of the names of the objects) or attempt to use default delimiters. In such embodiments, the storage service may request delimiter information from clients if the storage service is unable to infer the delimiters or successfully use default delimiters. The operations performed to identify portions of the data set that meet the logical predicates or criteria specified by the client may be termed "logical selection" operations in at least some embodiments. Note that in at least some embodiments, e.g., in scenarios in which the data set is distributed across numerous storage devices or nodes of the service, at least some operations used for the logical subdivision of the data may not necessarily precede all the sampling operations; for example, some logical selection operations may proceed at least partly in parallel with some sampling operations, or logical selection operations may even begin after some sampling operations have ended. In some embodiments, logical selection operations may not have to be performed at all, e.g., if the client indicates that the entire data set is to be subdivided according to the client's sampling criteria alone.

According to at least some embodiments, a system may comprise one or more computing devices, e.g., implementing various resources and artifacts of a network-accessible storage service. The computing devices may include instructions that upon execution on or across one or more processors cause the one or more computing devices to store, at one or more storage nodes, a data set comprising one or more objects. An indication of the internal structure of individual ones of the objects may not necessarily be provided to the storage service. The computing devices may receive, via a programmatic interface, a filter request from a client device for a portion of the data set. The filter request may include at least (a) one or more delimiters (e.g., record boundary indicators, and/or field/column boundary indicators), (b) a query predicate and (c) a disjoint subset descriptor. The disjoint subset descriptor may specify, with respect to a query result corresponding to the query predicate, one or more sub-range identifiers to be used to identify data records of a targeted fraction of the query result. For example, the client may specify sub-range identifiers "61-100" to indicate that 40% of the results that satisfy the query predicate, associated with identifiers between 61 and 100 from a default range of 1-100, are to be returned to the client.

At a service-side filtering manager of the network-accessible storage service, based at least in part on the delimiter(s) and the query predicate, a first query result comprising a plurality of data records may be extracted from the data set in various embodiments. A respective range mapping value (e.g., a real number between 0 and 100) may be assigned using at least one pseudo-random number generator to individual ones of the data records in at least some embodiments. Based on a comparison of the sub-range identifiers and the assigned range mapping values, a result set of the filter request comprising at least a portion of one or more data records may be identified, and transmitted to one or more destinations indicated in the filter request in various embodiments. For example, if the client indicated sub-range identifiers "60-100", and the range mapping values are real numbers between 0 and 100 (but not including 100), those records of the query result whose range mapping values are greater than or equal to 60, and less than 100, may be included in the overall result set of the filter request. The destinations to which the result set is sent may include, for example, client-side devices at which machine learning tasks such as the training or evaluation of models may be conducted, or any other devices indicated by the client. The result sets produced using such techniques may be described as being consistent in various embodiments because the techniques ensure that a given data set can be subdivided (repeatedly if desired) into randomized non-overlapping subsets.

Respective disjoint subsets to be used for training and testing a model may be obtained, for example, by submitting a first filter request for the training data subset, and then submitting a second filter request for the test data subset, with only the sampling parameter changed between the two filter requests. For example, to train a model with a particular 70% subset of the data set, sub-range identifiers [1-70] may be used, and then sub-range identifiers [71-100] may be used to retrieve the remaining 30% of the data set for testing. The same subsets may be retrieved again, if desired, to repeat the training and/or testing after tuning the meta-parameters of the model (or simply to debug or re-check the results of the model without any tuning changes). Alternatively, different subsets may be used for the next round of training and testing: e.g., sub-range identifiers [20-90] may be used for a different 70% training set, followed by sub-range identifiers [1-20, 90-100] for a different disjoint 30% test set.

As one skilled in the art will appreciate in light of this disclosure, certain embodiments may be capable of achieving various advantages and practical applications/benefits, including some or all of the following: (a) reducing the amount of computation, storage, memory and other resources required to train and test machine learning models of a desired quality, e.g., by ensuring that the training data used for a model does not overlap with the testing or evaluation data, (b) reducing, in scenarios in which large data sets are stored as unstructured objects at a network-accessible service, the amount of network bandwidth consumed in performing analytics operations on logical subsets of the data sets, by performing both logical and statistical sub-selection of data at the service side, and/or (c) the enhancing the user experience of data scientists and other users of large data sets, e.g., by providing easy-to-use interfaces to enable the repeatable and consistent extraction of desired samples of data.

In some embodiments, as suggested in some of the numerical examples above, a client of the storage service may use numeric values as sub-range identifiers/indicators.

In one embodiment, the storage service may, for example, assign mapping values to query result records from a default range of 0 to 100, and a client may similarly use values from the same range as identifiers of the desired fraction of records. Note that the mapping values may be assigned independently of the content of the query results, as the purpose of the mapping values is to help the storage service obtain a statistical sample of a set of records that already satisfy the client's logical or semantic requirements. In at least one embodiment, clients may customize their sub-range specifications. For example, if a data set is expected to include tens of thousands of records, and if the client wants more fine-grained consistent result sets, the client may select sub-range identifiers from a larger range of values, such as 1-10,000 or 1-100,000 instead of simply using 1-100. Using such an approach, the client may be able to re-extract the same records with greater precision than if values between 0 and 100 were used for the sub-range identifiers. For example, a client's submitted disjoint subset descriptor may include an indication of the overall range (e.g., 1-100,000) as well as the desires sub-ranges (e.g., 65,600-65,700 out of 1-100,000). The disjoint subset descriptor may thus indicate, to the storage service, an indication of a low end and a high end of the sub-range indicators, indicating a granularity at which data records are to be distinguished from one another for inclusion in the result set of the filter query. The range mapping values assigned by the storage service may be selected based at least in part on the desired granularity. In one approach, the precision of real numbers generated as range mapping values may be adjusted to meet the granularity requirements of the clients.

In at least some embodiments, a storage service may cache the range mapping values generated for the query results, and re-use the cached values to respond to another filter query. This approach may reduce the amount of computation that is needed to generate different disjoint subsets for a large query result, for example, or to re-generate the same result sets repeatedly. In at least one embodiment, the storage service may keep track of the query predicates submitted by a client for logical selection from a given data set, and start caching the range mapping values if the same query predicates are submitted more than a threshold number of times.

According to one embodiment, a client may wish to control the repeatability of filtering—e.g., if the client wants to obtain different results for the same filter request parameters, the client may notify the storage service that repeatability is not a requirement. In such a scenario, the client may programmatically provide a particular value for a repeatability setting with respect to one or more filter requests (or all of the client's filter requests). In accordance with the value selected for the setting, the storage service may provide different results for repeat submissions of the same filter request, or the same results. In one implementation, the storage service may store the seed value(s) used for one or more pseudo-random number generators (PRNGs) to respond to a particular filter request from a particular client, and/or re-set the internal state of the PRNGs, to satisfy repeatability criteria.

In some embodiments, the disjoint subset descriptor included in a filter request may be expressed using a variant of the Structured Query Language (SQL). In other embodiments, other techniques may be used to indicate the desired subsets. In at least one embodiment in which the data set to be sampled is stored as one or more unstructured objects, an indication of a schema (e.g., including record delimiters, column or filed names, etc.) to be imposed on the unstructured objects may be included in the filter request.

In at least one embodiment, the stored data set (and hence the query result) could be distributed among a plurality of nodes of the storage service, some of which may be located at different data centers than others. Parallelism may be used to extract the samples in some such embodiments. In one embodiment in which such a distributed parallelized approach is used, respective non-overlapping collections of range mapping values may be chosen for subsets of the data stored at different data centers. For example, range mapping values comprising real numbers between 0 and 50 may be assigned for a portion of a distributed query result at one data center, range mapping values between 50 and 80 may be assigned at a second data center, and range mapping values between 80 and 100 at a third data center (with the respective subset of range values of the different data centers being selected, for example, based on the cardinalities of the query results at the respective data centers). It may be the case that range mapping values may be assigned at one center in the above example at a point in time after some range mapping values have already been assigned at one or more other data centers, and before some range mapping values have been assigned at the other data centers.

According to at least some embodiments, the disjoint subset generation techniques described above may be implemented at a storage service implemented at a provider network or cloud computing environment which also includes a machine learning service. At the machine learning service, training and evaluation tasks for various models may be conducted using training disjoint data sets and test data sets extracted from the storage service. For example, a first filter request for 75% of a data set may be submitted from the machine learning service to extract the training set, and the model may be trained using the results of the first filter request. Then, a second filter request for a disjoint 25% of the data set may be submitted from the machine learning service, using the same query predicate as that of the first filter request, and a disjoint subset descriptor with non-overlapping sub-range indicators with respect to the first filter request. In some embodiments, clients of the machine learning service may simply specify the ratios of the training and test data subset sizes, and the machine learning service may automatically generate the sub-range descriptors needed to obtain non-overlapping data sets from the storage service, and submit corresponding filter requests to the storage service.

Example System Environment

FIG. 1 illustrates an example system environment in which consistent disjoint sampling algorithms may be implemented for large data sets at a filtering subsystem of an object storage service, according to at least some embodiments. As shown, system 100 may comprise various resources and artifacts of object storage service (OSS 102), including a physical storage subsystem 151, an object metadata repository 125, a filtering subsystem 156, a front-end request handling layer 189 and a monitoring/logging subsystem 166, each of which may comprise combinations of hardware and software running at one or more computing devices. Clients of the object storage service 102 may submit various types of requests via programmatic interfaces 177 (e.g., one or more web-based consoles, application programming interfaces (APIs), command-line tools, graphical user interfaces and the like) from a variety of client devices 180 (such as laptops, desktops, and the like) to perform storage-related operations. In some cases, the client devices 180 may include devices used for training/evaluating machine learning models, for which data sets may have to split up into disjoint training and test subsets.

Using programmatic interfaces 177, a client may request the creation of an item collection 120 (sometimes referred to as a bucket), such as collections 120A-120C, and then create, read, modify/update/rename and/or delete various individual objects or data items within the collections 120. In the depicted example, unstructured data items (UDIs) 122A and 122B may be created within container 120A, unstructured data items 122K and 122L may be created within container 120B, unstructured data items 122P and 122Q may be created within container 120C, and so on. The data items may be termed unstructured in that, at least for some items of some containers, there may be no requirement that a client indicate a schema or define a set of content attributes or columns, either at the time that the item is created or at any later stage of the lifecycle of the data item in the depicted embodiment. Instead, from the perspective of the object storage service 102, an unstructured data item may at least initially be treated as an opaque collection of bits or bytes.

According to at least some embodiments, a client may use programmatic interfaces 177 to submit filter requests with respect to one or more unstructured data items, indicating to the OSS 102 that only a subset of the contents of the targeted UDIs is to be returned. In one embodiment, a filter request may include at least (a) one or more record boundary delimiters and/or field boundary delimiters to be used to impose a structure or a schema on the UDIs, (b) a query predicate, and (c) a disjoint subset descriptor. The disjoint subset descriptor may specify, with respect to a query result corresponding to the query predicate, one or more sub-range identifiers to be used to identify data records of a targeted fraction or percentage of the query result. In response, using the delimiters and the query predicate, one or more filtering managers 158 implemented at filtering subsystem 156 may generate a query result comprising a plurality of data records from the UDIs in the depicted embodiment. Furthermore, in accordance with a consistent disjoint sampling algorithm 159, the filtering manager 158 may assign, to various ones of the extracted data records, a respective range mapping value using one or more pseudo random number generators (PRNGs) 190. Using the assigned range mapping values and the disjoint subset descriptor indicated by the client in the filter request, a result set comprising one or more data records may be identified from the query result, and transmitted to the client device (and/or to other destinations indicated in the filter request) in various embodiments. In some embodiments, a client may indicate or provide programs that can be executed by the storage service to extract logical subsets and/or to sample the extracted logical subsets, thus in effect implementing client-selected logic at the storage service instead of relying on the service's algorithms, PRNGs, etc.

An object metadata repository 125 of the OSS 102 may comprise such metadata as creation timestamps 160 of the various items, access timestamps 162 (e.g., when an item was last read or modified), and/or ownership information 164 (e.g., information indicating the identity of the specific clients on whose behalf the containers and/or items are created, the identities of clients to whom administrative privileges to create/modify security rules associated with items or containers have been granted, and so on). In some embodiments, creation timestamps and/or access timestamps may be referenced in the query predicates—e.g., to filter only the records generated in the previous 7 days, and so on. Any of a variety of storage device types may be used to store the object contents (e.g., within physical storage subsystem 151) and metadata in various embodiments— e.g., a distributed collection of rotating disk-based storage devices, solid-state devices, and the like spread among multiple data centers may be used to achieve desired levels of data resiliency and availability. In at least some embodiments, various types of encoding and/or replication algorithms 152 may be employed to achieve targeted resiliency, performance, and storage resource utilization levels.

The object storage service 102 may comprise a front-end request handler layer 189, as well as the filtering subsystem 156 in various embodiments. In the depicted embodiment, clients 180 may submit at least two types of access or read requests directed to the UDIs 122—unfiltered access requests, as well as filter requests. Arrow 178A indicates unfiltered access requests and responses, while arrow 178B indicates filter requests and responses. In response to an unfiltered access request, the OSS 102 may provide a response which contains all the content of one or more UDIs 122 of one or more item collections 120 in the depicted embodiment. In contrast, in response to filter requests, only a subset of the contents of one or more UDIs 122 may be returned with the help of the filtering subsystem 156 in the depicted embodiment. Note that to generate a response to a filter request, any combination of three types of reductions of the results may be implemented: record-count reductions (similar to selections in SQL), field reductions (similar to projections in SQL), and sampling based on specified disjoint subset descriptors (typically involving discarding a randomized, statistical subset of the results of the results of the record-count reductions, while retaining the result columns/fields of the field reduction operations, if any). In various embodiments, the front-end request handler layer 189 may determine, e.g., based on the parameters indicated in a given access request, whether the request is to be processed at the filtering subsystem 156 or not. If the request is to be processed at the filtering subsystem, a representation of the request may be transmitted to a filtering manager 158 in at least some embodiments.

In at least some embodiments, intermediate artifacts and/ or final results of some filtering operations performed by filtering managers 158 may be stored temporarily in a cache managed by one or more cache managers 157 at the filtering subsystem 156; such cached results may be used to avoid having to access the physical storage subsystem for some filtered access requests, or to avoid re-computing range value mappings and the like. With respect to filter requests that are expected to be re-submitted with a modified disjoint subset descriptor, in some embodiments the range value mappings assigned to individual data records of the query result of the filter request may be cached. Thus, for example, if a first filter request FR1 with a query predicate QP1 is received with a disjoint subset descriptor indicating that a 70% subset of the query result is to be provided to a client device, the OSS may cache the mapping values generated to respond to FR1 for at least some time period, in the expectation that a second filter request FR2 with the same query predicate QP1 may be submitted at some point for a disjoint subset (e.g., 30%) of the query result. In some embodiments, having submitted a filter request FR1 with query predicate QP1, a client need not even specify the query predicate for a follow-on filter request for a disjoint subset of the query results—instead, a pointer to FR1 (e.g., an identifier assigned to the filter request by the OSS) may be submitted for the follow-on filter request, with the modified disjoint subset descriptor to indicate that a different subset is desired. In at least some embodiments, the temporal patterns of various filtered access requests may be analyzed at the filtering subsystem 156, e.g., by a filtering manager 158, and the probability of occurrences of similar future filtered access requests may be predicted based on the patterns. If a particular filtered access request is expected to occur with a high probability, in one embodiment, a result set corresponding to the predicted request may be generated in advance of the actual occurrence of the request, and stored in a cache. The proactively generated result set may then be used if/when the predicted filtered access request is received.

In at least some embodiments, the OSS 102 may comprise a monitoring and logging subsystem 166, which may be used to obtain and analyze metrics pertaining to a variety of operations performed at the OSS. In some embodiments, metrics pertaining specifically to filter requests for disjoint subsets may be collected (e.g., indicating the sizes of the disjoint subsets returned, relative to the overall sizes of the data sets, or the frequency at which requests for disjoint subsets are received, etc.) and analyzed, and placement decisions regarding UDIs may be made based on such analysis.

In some scenarios, the sizes of individual UDIs 122 may be quite large—e.g., items that are petabytes in size may be supported by the OSS 102. Only a small subset of the contents of a given UDI may be needed for a particular client application; the client may therefore use filter requests to reduce the amount of data that has to be transferred to the destination computing devices at which the client application is to be run, and to reduce the amount of memory/storage required at the destination devices. In at least some embodiments, clients may also be able to specify, in a filter request, one or more transformations to be applied to the filtering results, before the results are transmitted to their destinations from the OSS 102. In one simplified scenario, for example, the raw data of a UDI may be stored in the equivalent of a CSV (comma separated variable) format at the physical storage subsystem, and the client may specify, in an access request, that a subset of variables of formatted records extracted from the UDI is to be returned in a JSON (JavaScript Object notation) format.

In at least some embodiments, several alternative approaches towards filtering requirement specifications may be supported at the OSS. For example, clients may use an SQL-like language to indicate one or more queries to be used to select logical subsets of UDI contents (and/or to indicate disjoint subset requirements), or regular expressions may be used. In some embodiments, storage devices of several different categories with respect to performance and/or cost-per-storage-unit may be employed at the physical storage subsystem, and contents of some UDIs may be moved among the categories based on the patterns of filtering requested by client, e.g., either automatically or after obtaining approvals from the clients. For example, if a client's submitted access requests indicate that 80% of the contents of a set of UDIs are read very rarely, the rarely-accessed subset may be moved from a fast, relatively expensive set of physical storage devices to a somewhat slower set of physical storage devices to obtain cost savings for a client.

Example Applications Requiring Disjoint Subsets of Data

Figure 2:
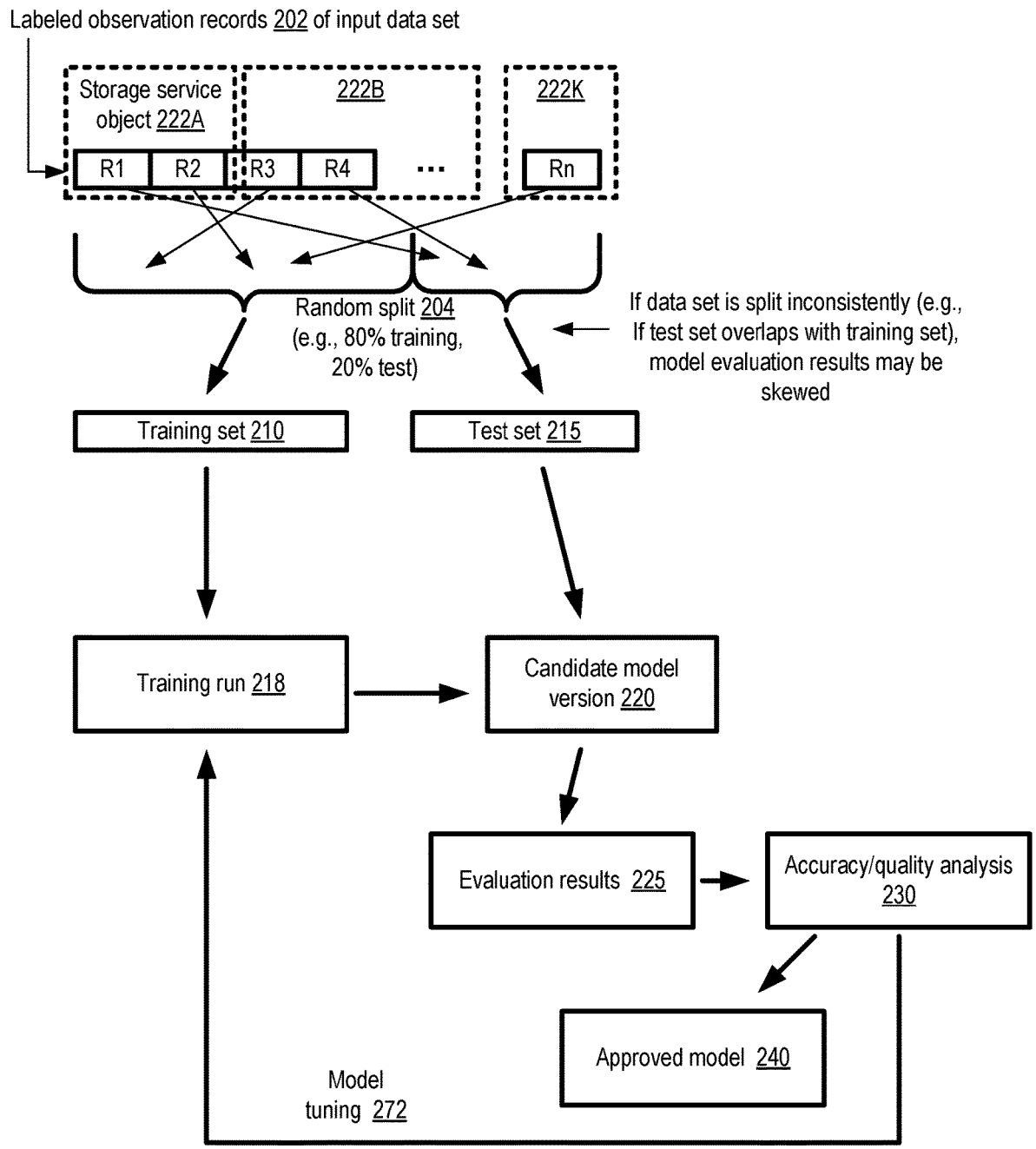
FIG. 2 illustrates an example scenario in which a data set may be split up into disjoint training and test subsets for a machine learning model, according to at least some embodiments.

Several types of machine learning tasks may benefit from consistent sampling techniques of the kind introduced above. FIG. 2 illustrates an example scenario in which a data set may be split up into disjoint training and test subsets for a machine learning model, according to at least some embodiments. An input data set comprising labeled observation records 202 (i.e., observation records R1, R2, . . . , for which the values or "labels" of dependent variables are known) may be stored within various data items or objects 222 of a storage service, such as objects 222A, 222B, and 222K. A split operation 204 may be performed to obtain a disjoint pair of subsets of the overall input data set: training set 210 and test set 215. For example, 80% of the records may be included in the training set 210 in one scenario, and the remaining 20% may be included in the test set 215. A candidate model version 220 may be trained in a training run 218 (e.g., for a linear regression model, candidate coefficients to be assigned to the various independent variables of the data set may be determined to generate the candidate model version). The candidate model 220 may then be used to make predictions on the test set 215, and the evaluation results 225 of the model may be obtained (e.g., indicating how accurately the model was able to generate predictions for the dependent variables of the records of the test set using the candidate coefficients). A variety of measures 230 of the accuracy or quality may be obtained in different embodiments, depending on the type of model being used—e.g., the root mean square error (RMSE) or root mean square deviation (RMSD) may be computed for linear regression models, the ratio of the sum of true positives and true negatives to the size of the test set may be computed for binary classification problems, and so on.

If the accuracy/quality measures 230 are satisfactory, the candidate model 220 may be designated as an approved model 240 in the depicted embodiment. Otherwise, any of several techniques may be employed in an attempt to improve the quality or accuracy of the model's predictions. Model tuning 272 may comprise modifying the set of independent variables being used for the predictions, changing model execution meta-parameters (such as a minimum bucket size or a maximum tree depth for tree-based classification models), and so on, and executing additional training runs 218. Model tuning may be performed iteratively using the same training and test sets, varying some combination of independent variables and meta-parameters in each iteration in an attempt to enhance the accuracy or quality of the results. In other approaches to model improvement, different training and test data subsets may be identified for successive training-and-evaluation iterations. For example, the input data set may be shuffled, and a new pair of training/test sets may be obtained for the next round of training. For each training and evaluation iteration, if the data set is split inconsistently (e.g., if the test subset overlaps with the training subset), the candidate model evaluation results may be skewed, providing more favorable evaluations than the candidate model version deserves. This can in turn lead to substantial wasted resources, as the model may be deployed to production, found to provide poorer results than anticipated, and then the model may have to be retrained. Note that in many cases, the training of a particular version of the model may take a non-trivial amount of time (e.g., days or even weeks), so the test data subset may have to be obtained much later than the training data subset. Furthermore, in some cases, training and testing may be performed on different sets of servers, further complicating the problem of obtaining consistent subsets for the two phases of model development. In another example scenario in which consistent disjoint subsets of the input data set may be important, one data scientist may need to reproduce the results obtained by another (in a training run, a test/evaluation run, or both), so being able to replicate the subsets that were obtained earlier may be essential.

Figure 3:
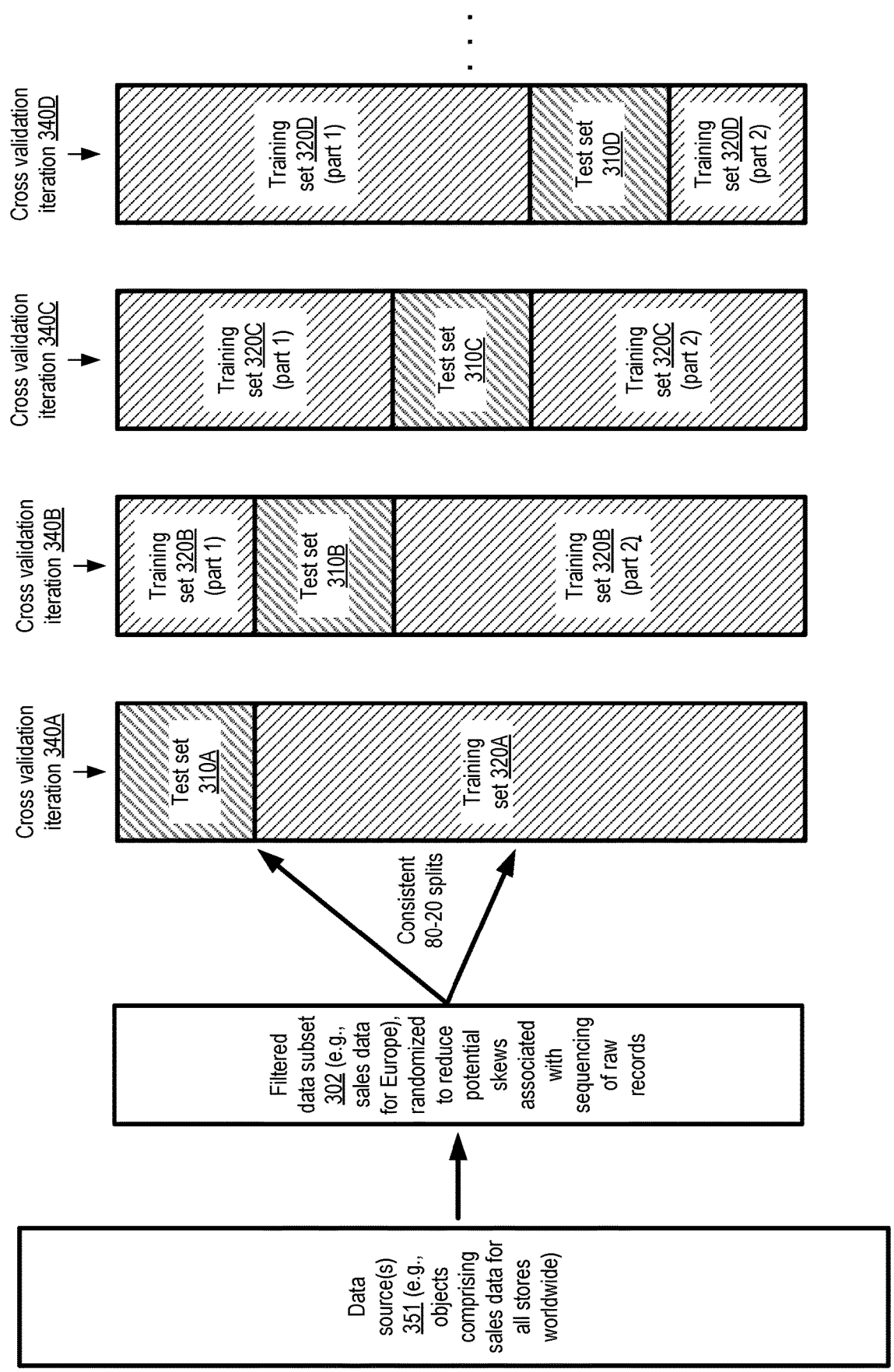
FIG. 3 illustrates an example scenario in which a data set may be split up repeatedly into distinct pairs of subsets for cross-validating a machine learning model, according to at least some embodiments.

In some embodiments, a machine learning application may utilize the disjoint subset extraction techniques introduced above multiple times to obtain distinct combinations of disjoint subsets of the same data set. FIG. 3 illustrates an example scenario in which a data set may be split up repeatedly into distinct pairs of subsets for cross-validating a machine learning model, according to at least some embodiments. In the depicted embodiment, one or more data sources 351 may comprise a collection of objects that store sales data for all stores of a large global retail organization. A logically filtered data subset 302, e.g., comprising sales data only for stores located in Europe may be extracted for analysis. The filtered data subset may be randomized to reduce potential skews associated with sequencing of the raw records.

Then, the filtered data subset 302 may be subdivide or split several different ways into 80%-20% subsets, with each subdivision or split being used for a respective cross-validation operation of a prediction model (e.g., a model to predict sales in Europe). In each cross validation iteration 340 (e.g., iterations 340A-340D), a respective training set 320 (e.g., 320A-320D) each comprising 80% of the filtered data subset may be obtained and used to train the model, and corresponding test sets 310 (e.g., 310A-310E) comprising the remaining 20% of the data may be generated for evaluating the model. As in the scenarios discussed in the context of FIG. 2, overlaps among the training and test data subsets may lead to inaccurate results in the cross-validation iterations, so being able to sample the data consistently using the techniques introduced earlier may be extremely helpful.

Example Use of Range Mappings and Sub-Range Identifiers

Figure 4:
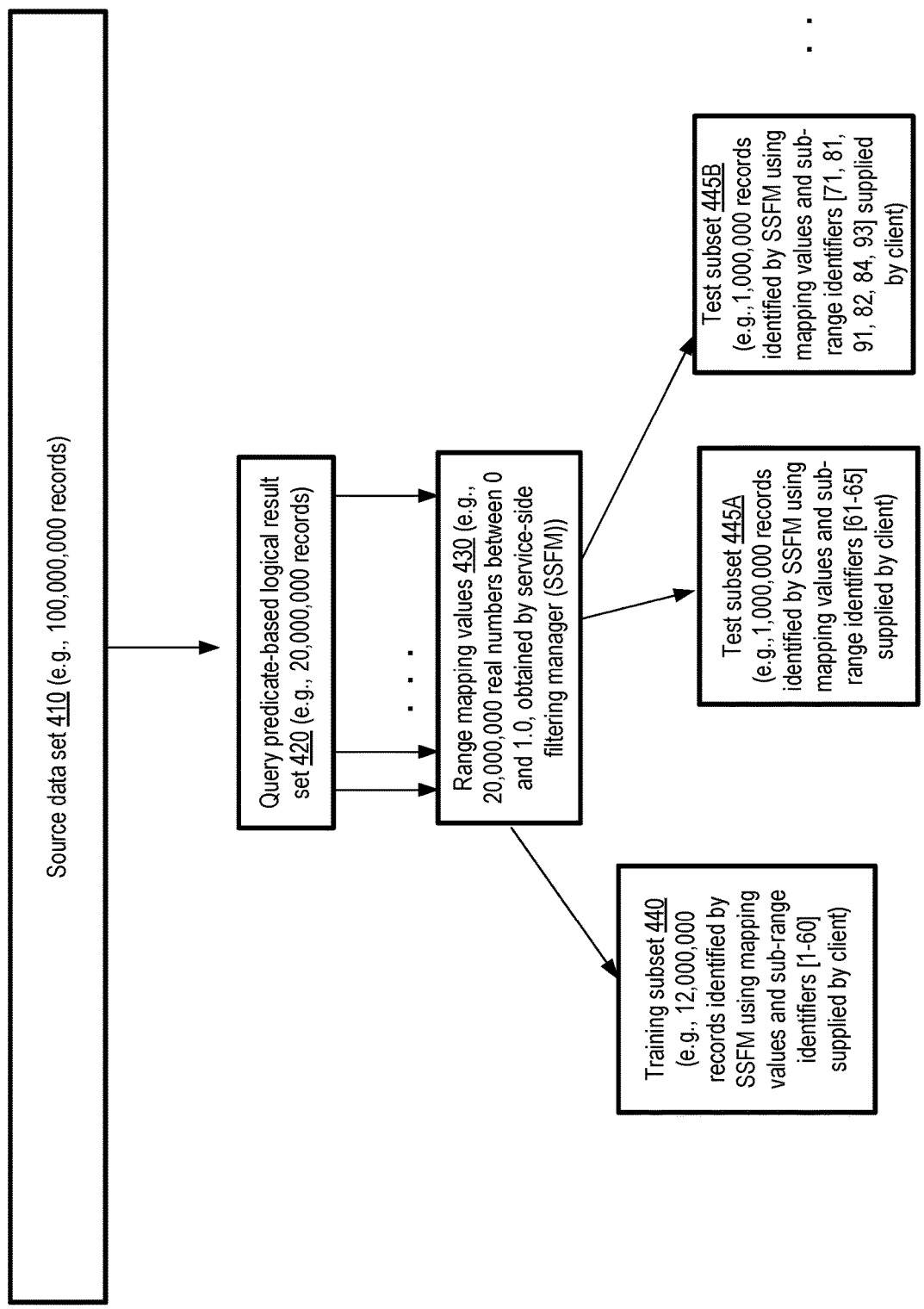
FIG. 4 illustrates an example scenario in which range mapping values and sub-range identifiers may be used to generate distinct subsets of data sets at a service-side filtering manager, according to at least some embodiments.

FIG. 4 illustrates an example scenario in which range mapping values and sub-range identifiers may be used to generate distinct subsets of data sets at a service-side filtering manager, according to at least some embodiments. An original or source data set 410 may comprise 100,000,000 records in the depicted scenario. From the original data set, a query predicate-based logical result set 420 may be extracted, comprising for example 20,000,000 records. Note that at least in some embodiments, as mentioned earlier, the original data may be reduced along two dimensions: the total number of records may be lowered substantially by applying the query predicate, and the amount of data per record may also be reduced, by eliminating un-needed fields or columns.

A service-side filtering manager (SSFM), similar in functionality to filtering manager 158 shown in FIG. 1, may assign respective range mapping values, such as real numbers between 0 and 1.0, to each of the member records of the logical result set 420 in the depicted embodiment, e.g., using one or more pseudo-random number generators. The filter manager may be described as being a "service-side" component because its filtering operations are performed using resources of the storage service, prior to transferring the filtering results to the client's specified destinations (which may be said to constitute the "client-side" components of the system).

A client may submit a filter request with a disjoint subset descriptor to obtain a particular subset of the query result. For example a training subset 440 may be obtained by specifying the rub-range identifiers [1-60] in the depicted scenario. This may result in the SSFM providing those records whose range mapping values were in between 0.0 and 60.0 in the depicted embodiment. Note that the result provided for the training subset is not simply a collection of 60% of the query results (12,000,000 records), but a specific subset of the records whose assigned range mapping values fall within a particular range determined by the "[1-60]" identifiers. Had the client submitted the sub-range identifiers "[2-61]", a slightly different set of records, with range mapping values between 0.1 and 61.0, may have been supplied instead. Note that the syntax used for specifying sub-range identifiers may vary in different implementations.

Similarly, the client may obtain specific test subsets 445A and 445B, each comprising a distinct subset of 1,000,000 records of the query result, using respective sub-range identifiers [61-65] and [71, 81, 91, 82, 84, 93] in the depicted embodiment. The exact manner in which integers in the client's sub-ranges are mapped to the nearby real numbers of the range mapping values may differ in different embodiments. For example, in some embodiments, the sub-range identifier "71" (used for test subset 445B) may result in the SSFM returning the records whose range mapping values are (a) greater than or equal to 0.71 and (b) less than 0.72; in other embodiments, the records whose range mapping values are (a) greater than 0.71 and (b) less than or equal to 0.72 may be returned. As mentioned earlier, in some embodiments, clients may specify the granularity at which respective disjoint subsets are to be generated by the SSFM—e.g., a client may use integers in the range 1-100,000 to control sampling at a finer granularity than can be obtained using integers in the range 1-100 for sub-range identifiers.

Example Elements of a Filter Request

Figure 5:
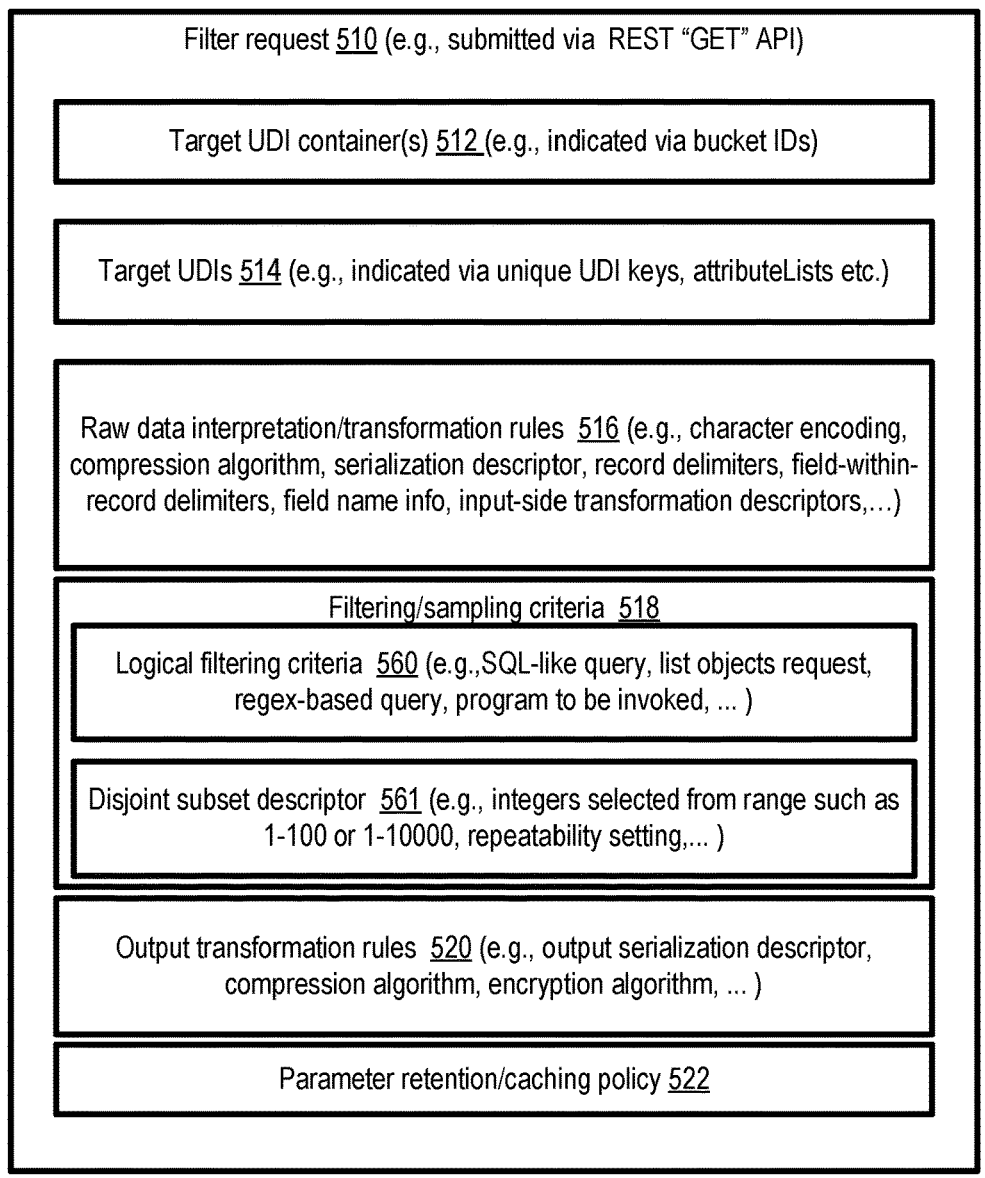
FIG. 5 illustrates example elements of a data access request that may be submitted to a storage service, according to at least some embodiments.

FIG. 5 illustrates example elements of a filter request that may be submitted to a storage service, according to at least some embodiments. In the depicted embodiment, filter request 510, which may for example be submitted via a REST API (representation state transfer application programming interface) such as a "GET", may comprise an indication 512 of one or more targeted UDI containers or collections and/or one or more targeted UDIs 514. In embodiments in which item collections or containers are assigned unique identifiers such as bucket IDs, one or more such bucket IDs may be used to identify the containers from which the raw data is to be extracted. The indication of the specific target data items from which a subset (or all) of the item contents are to be used to generate the response to the filter request may be provided in any of several ways in different embodiments—e.g., by providing unique identifiers or keys of the UDIs, by providing metadata attribute lists, and so on. As indicated in FIG. 1, a number of metadata attributes of UDIs in addition to item identifiers may be maintained at the object storage service in various embodiments, such as creation timestamps, access timestamps, ownership information etc., and one or more predicates expressed in terms of such metadata attributes may be used to initially identify one or more UDIs on which further filtering is to be performed.

One or more raw data interpretation or transformation rules 516 may be indicated in access request 510 in some embodiments; such rules may be used to subdivide a UDI into smaller records for the purposes of the access request. The interpretation rules may, for example, indicate one or more of: a character encoding, such as UTF-8 (Unicode Transformation Format—8-bit)) to be used to interpret the bits and bytes of the raw data, a compression algorithm (if compression was used) used for storing the raw data, a serialization descriptor indicating the format in which the data was stored (such as JSON (JavaScript Object Notation) or CSV (comma-separated values)), delimiters which can be used to distinguish among successive records within a given UDI, field-within-record delimiters indicating how a given record should be subdivided into fields, field name information (e.g., names or labels to be assigned to the sequence of field contents identified using field-within-record delimiters), other input-side transformation descriptors which indicate if/how the input data is to be processed prior to evaluating the logical filtering criteria 560 indicated in the access request, and so on. Consider an example scenario in which individual records are to be extracted from a given unstructured data items or objects using periods (".") as record delimiters, and individual fields are to be extracted from a given record using one or more whitespace characters as field-within-record delimiters. If K different fields are extracted from a given record, the field name information provided in the interpretation rules may, for example, indicate that in the sequence of K fields, the first field is to be considered a "last name" with respect to a query, the second field is to be considered a "first name" and so on. If a compression algorithm is indicated, a corresponding decompression algorithm may be employed to extract the contents of the UDI to respond to a filtered access request. In some embodiments, the contents of the UDIs may have been encrypted prior to storing, in which case a decryption algorithm or methodology (which may involve the use of one or more keys indicated in the request) may be specified in the request.

One or more filtering and sampling criteria 518 may be indicated in the access request to enable the object storage service to identify subsets of the records (generated using the interpretation rules) which are to be included in a result set to be used to prepare the response to the access request in the depicted embodiment. As mentioned earlier, at least two types of criteria may be used to down-select data from the UDIs in some embodiments: logical filtering criteria 560, and disjoint subset descriptors 561 to be used to further reduce the results of the logical filtering.

In some embodiments, an SQL-like query or queries may be specified as the filtering criteria 560. For example, if a given record extracted from the unstructured UDI can be subdivided into fields F1, F2, F3, etc., the query may contain Boolean combinations of one or more predicates such as (F1==A) AND ((F2==B) OR (F3==C)). The query may also indicate the subset of the fields to be included in the result set from a record which satisfies the query predicate in various embodiments: e.g., a query similar to "select (record.F1, record.F2) where (F1==A) AND ((F2==B) OR (F3==C))" may be used, or a query similar to "select record.* where (F1==A) AND ((F2==B) OR (F3==C)))" may be specified. Filtering criteria 560 may be expressed using other languages or techniques in various embodiments—e.g., a syntax similar to that used for the Linux "grep" utility, in which regular expressions are used to indicate the subset of records to be retrieved, may be employed. In at least one embodiment, a program that is to be invoked at or by the object storage service to determine whether a given record is to be included in a result set may be specified by the client in an access request. Such a program may, for example, be executed using an event-driven computing service of a provider network, as discussed below in further detail, without requiring pre-allocation or advance provisioning of compute servers in some embodiments. In a scenario in which a client indicates a program to be used to filter record contents, the logic of the program may remain opaque to the service in at least some embodiments—that is, the conditions or predicates that are being evaluated by the program may not be exposed or revealed to the service. In some embodiments, the storage service may support a list-objects API (conceptually similar to the "ls" command of Linux operating systems), e.g., to obtain a listing of objects within a container such as a bucket, and the list-objects API may be used to indicate the logical filtering requested.

The disjoint subset descriptor 561 may indicate sub-range identifiers (e.g., integers in a selected range, such as [1-45] from a range of 1-100, or discrete integers such as [3, 7, 9, 18] from such a range) that can be used to unambiguously identify specific records from the results obtained using the logical filtering criteria 560. In some embodiments, a client may specify a range of integers (e.g., 1-100, or 1-10000) which is to be used to construct the disjoint subsets in the filter request (or in advance of the filter request), thus indicating a minimum granularity at which the results of the logical filtering are to be mapped to range values. In one embodiment, a client may include one or more seed values, or an identifier of a type of PRNG (pseudo-random number generator) to be used for generating the range value mappings. In some embodiments, when submitting a filter request 510 in which only the disjoint subset descriptor is modified with respect to a previous filter request, an identifier of the previously-submitted request may be included in the newer filter request, along with the disjoint subset descriptor. Note that a disjoint subset descriptor may of course also be used to request an overlapping subset relative to a previously-requested subset in various embodiments. For example, in a scenario in which integers in the range 1-100 are used to identify subsets, a first request R1 specifying subset identifiers [20-70] may be followed by a second request R2 with subset identifiers [30-80] to obtain a result that overlaps with 80% (corresponding to the overlapping subset identifiers [30-70]) of the result of R1. In some embodiments, a repeatability setting may be included in the filter request, e.g., in the disjoint subset descriptor 561, to cause the storage service to either provide identical result sets for repeat submissions of identical filter requests, or to provide distinct result sets for repeat submissions of identical filter requests. Logical filtering criteria 560 and/or disjoint subset descriptors 561 may be omitted from some filter requests 510 in various embodiments; if both are omitted, the entire contents of the target UDIs may be provided in response to the filter request.

In at least some embodiments, one or more output transformation rules 520 may be indicated in an access request. Such rules may optionally be used in such embodiments to indicate how one or more fields, whose values are extracted from records which satisfy the filtering and sampling criteria 518, are to be formatted or presented within the response to the filter request 510. An output serialization descriptor (e.g., indicating that JSON or CSV should be used), a compression algorithm, and/or an encryption algorithm and the like may be indicated to specify the rules 520 in various embodiments.

In at least one embodiment, a client may also indicate a parameter retention and/or caching policy 522, indicating for example whether the client grants permission to the object storage service to perform various types of caching (including the caching of range mapping values generated for disjoint subsets) to enable responses to future access requests to be provided more quickly.

In some embodiments, some of the access request elements shown in FIG. 3 may be provided once for several (or all) access requests submitted by a client—e.g., the parameter retention/caching policy 522 may be provided either at a global level, or at a per-access-request level. In some embodiments, defaults may be used at the object storage service for one or more of the elements shown in FIG. 5 if a filter request does not include the element—e.g., a default parameter retention/caching policy may be used if none is specified, and so on.

Depending on the use case or application, different interpretation rules 516 may be specified by a client to extract formatted records from a given UDI in some embodiments; that is, the manner in which unstructured data is to be understood or evaluated may be changed by a client by selecting the appropriate interpretation rules. For example, a byte sequence of a particular UDI may be interpreted as comprising formatted records {Rec1} in accordance with interpretation rules R1 for application A1, and as a completely different set of formatted records {Rec2} in accordance with rules R2 for application A2. Rules R1 may indicate a different set of record delimiters and/or field descriptors than rules R2 in such a scenario.

Example Alternative Storage Devices and Filtering/Sampling Approaches

Figure 6:
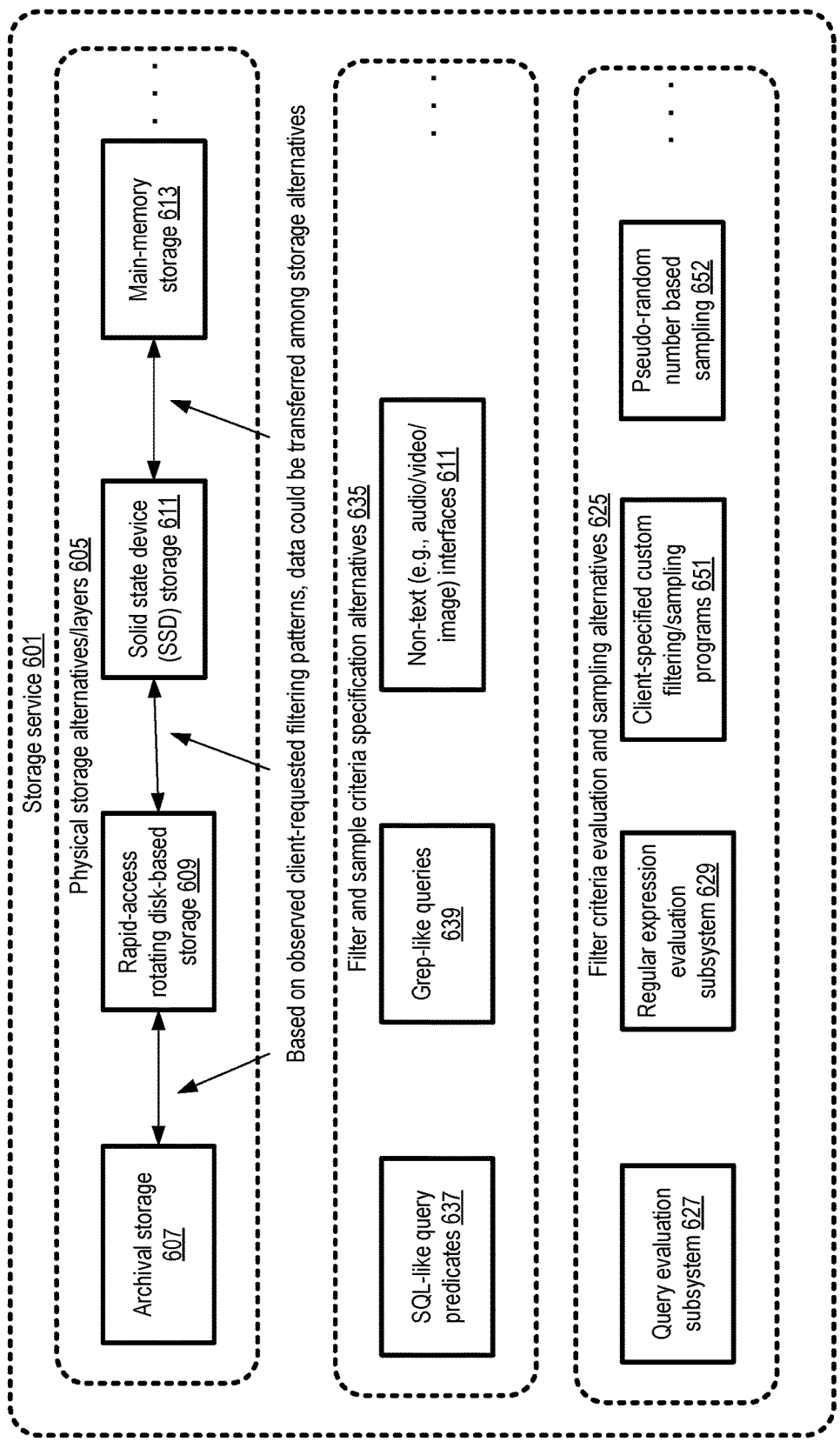
FIG. 6 illustrates example alternative physical storage device types as well as filtering and sampling approaches that may be employed at a storage service, according to at least some embodiments.

FIG. 6 illustrates example alternative physical storage device types as well as filtering and sampling approaches that may be employed at a storage service, according to at least some embodiments. As shown, the physical storage alternatives 605 offered by the service 601 may include (in order of faster average response times for accessing stored items) archival storage 607, rapid-access rotating-disk based storage 609, solid state device (SSD) storage 611, and/or main-memory storage 613 in some embodiments. The physical storage subsystem of the object storage service may be organized into respective layers in some embodiments, with a respective set of storage devices implementing each of the storage alternatives—e.g., the service may include a main memory layer, an SSD layer, a rotating-disk layer, and an archival layer. The archival layer may, for example, use slower disk devices, tape devices and the like in some embodiments. A given data item or object may be stored using one or more of the different storage device types in some embodiments. In at least one embodiment, portions of an item or an item collection may be distributed among, or replicated at, several different layers of the physical storage subsystem using respective types of storage devices. For example, a portion of an object that is accessed less frequently may be stored at "colder" storage such as archival storage, than other portions which may be accessed more frequently. In at least some embodiments, based on observed client-requested filtering patterns, subsets of the contents of various data items may be transferred among the physical storage layers. In at least one embodiment, before performing such a transfer for a given data item, the service may obtain permission from the client on whose behalf the item was created. In one embodiment, the client may grant permission to the object storage service to move or transfer various data items, as long as desired response time targets are met for various types of operations on the items.

With respect to the manner in which filtering and sampling criteria can be expressed in access requests directed to the object storage service, alternatives 635 may include SQL-like query predicates 637, grep-like queries 639 and/or non-text interfaces 611 in the depicted embodiment. Users of various types of database management systems, including relational databases and the like, may be familiar with SQL and may prefer the SQL-like query language supported by the object storage service in various embodiments. Grep-like queries 639 may enable clients familiar with regular expressions to formulate fairly elaborate filtering requirements relatively succinctly in some embodiments. In at least one embodiment, filtering criteria may be expressed with respect to images, videos, audios and the like using interfaces 611—e.g., a client may request, by providing a picture of a car, that pictures of other cars that are part of the contents of data items within a given bucket or item collection be retrieved, or that pictures that do not contain cars be retrieved from some set of data items. In some embodiments, disjoint subset descriptors may also indicated using SQL-like syntax, e.g., by adding keywords such as "DISJOINT SUBSET RANGE" or the like; similarly, syntactical elements may be provided to add subset indicators to grep-like queries and non-text interfaces.

Corresponding to the different types of filtering/sampling criteria specification alternatives 635, the object storage service may implement alternatives 625 for actually performing the requested type of filtering and sampling in various embodiments. A query evaluation subsystem 627 may be employed for SQL-based filtered access requests, a regular expression evaluation subsystem 629 may be used for grep-like queries, and so on in various embodiments. In at least one embodiment, clients may provide or indicate custom filtering criteria evaluation programs and/or custom sampling programs 611 to the storage service 601, which may be employed for the client's filter requests. In some embodiments, based for example on analysis of a client's item accesses, the object storage service may be able to provide recommendations to optimize various aspects of the interaction of the client with the service. For example, the service may suggest that some items be moved from one physical storage layer to another to save costs, or that a different types of filter/sample criterion specification approach be used to speed up certain types of accesses.

Example Provider Network Environments

Figure 7:
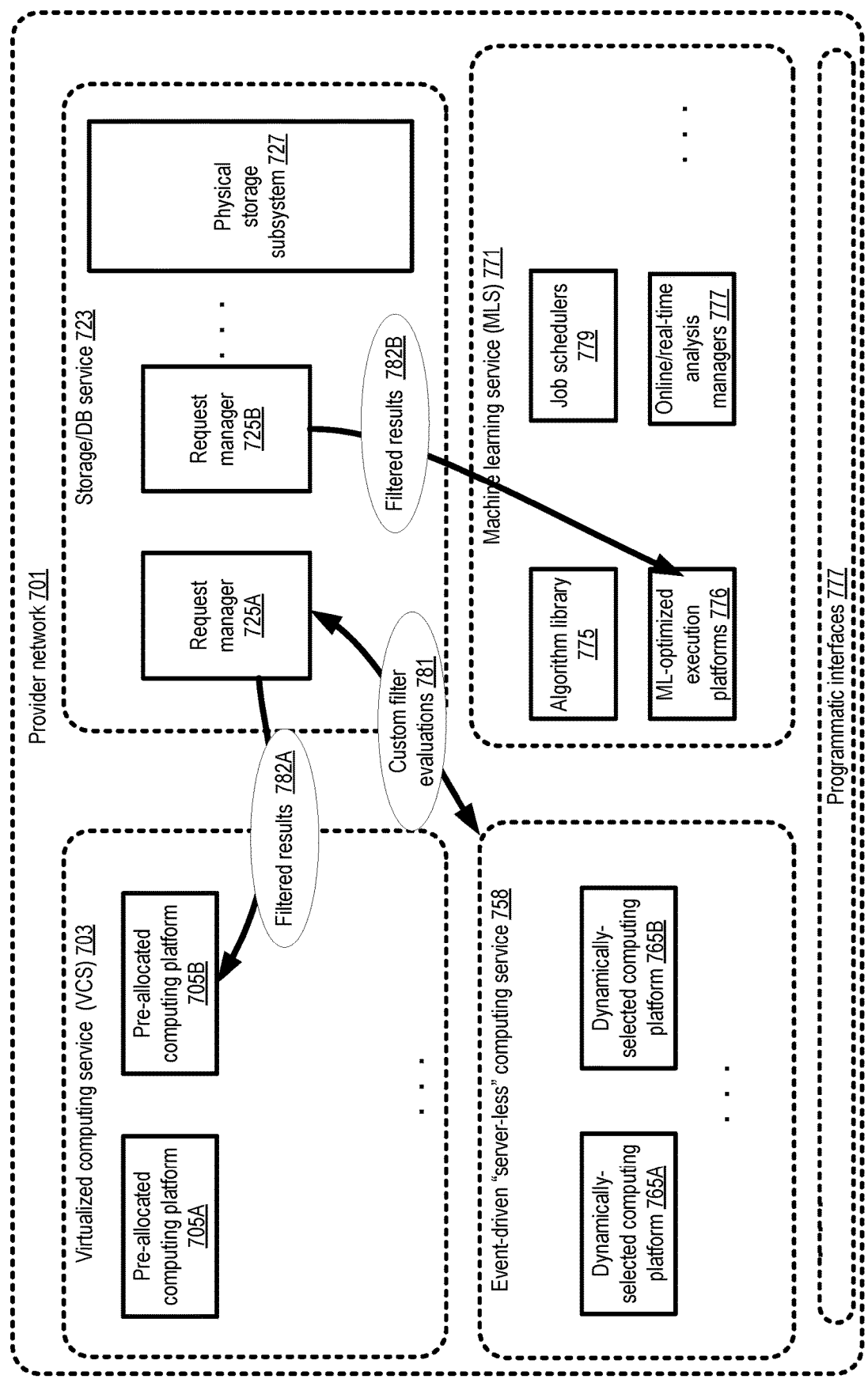
FIG. 7 illustrates an example provider network environment at which one or more services supporting filtered retrieval of disjoint subsets of data sets may be implemented, according to at least some embodiments.

FIG. 7 illustrates an example provider network environment at which one or more services supporting filtered retrieval of disjoint subsets of data sets may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtualized computing service (VCS) 703, an event-drive "server-less" computing service 758, a storage or database service 723 (implementing at least some features and functionality similar to that of object storage service 102 of FIG. 1), and/or a machine learning service (MLS) 771. The storage service 723 may, for example, enable clients to store data items of arbitrary size using various types of devices of a physical storage subsystem 727. Request managers such as 725A and 725B may process programmatic requests directed at the data items—e.g., including requests to create, delete, read or write various types of data items. Access requests with and without filtering and/or sampling criteria specified may be handled in the depicted embodiment. Components of a given service may utilize components of other services in at least some embodiments—e.g., for some machine learning tasks, a component of the machine learning service 771 may utilize pre-allocated virtual machines implemented at computing platforms of the virtualized computing service 703. Input data, intermediate results, final results and/or other artifacts of various machine learning algorithms or models may be stored at physical storage subsystem 727 of storage service 723 in some embodiments. In some embodiments, the storage or database service may store unstructured data objects, while in other embodiments tables implementing a relational data model may be stored. Individual ones of the services shown in FIG. 7 may implement a respective set of programmatic interfaces 777 which can be used by external and/or internal clients (where the internal clients may comprise components of other services) in the depicted embodiment.

The event-driven computing service 758 may differ from the virtualized computing service 703 in that pre-allocation of specific virtual (or physical) machines may not be required at the event-driven computing service in the depicted embodiment. If a client of the provider network wishes to execute a relatively short-lived program, in some embodiments the client may simply provide a representation of the program to the event-driven service, and indicate an event which is to trigger the execution of the program (the event may for example be the submission of a request to run the program, or the completion of another program). When a triggering event is detected, the service 758 may select an appropriate execution platform from a pool of existing platforms, or instantiate a new execution platform, run the requested program there, and provide results of the execution to a destination specified by the client. In contrast, before using resources of the virtualized computing service, a client may typically have to request that a particular computing platform 705 (e.g., a virtual machine) be provisioned and allocated to the client. In some embodiments, a client of the storage service may indicate that a program is to be run using an event-driven service 758 to implement filtering and/or sampling.

The storage service 723 may interact with other services of the provider network in any of several ways in the depicted embodiment. Some clients of the provider network may run applications using the pre-allocated computing platforms 705 (e.g., 705A or 705B), and the results 782A of filter requests may be obtained at such pre-allocated computing platforms. For some types of machine learning-based applications, algorithms selected from a library 775, such as various deep learning algorithms, may be run using execution platforms 776 that are optimized (e.g., using graphics processing units or the like) specifically for machine learning. Filtered results 782B of access queries directed to objects containing input data (e.g., disjoint training subsets and test subsets of the kind discussed earlier) for such applications may be transmitted to such optimized platforms 776 in the depicted embodiment. In some embodiments, requests to train some types of machine learning models may be handled as batch jobs at the machine learning service, and a batch job scheduler 779 may orchestrate the allocation of resources for the jobs as well as dependencies among jobs. In some embodiments, online/real-time analysis managers 777 of the MLS 771 may be used to quickly generate predictions or inferences using models trained and tested with disjoint subsets of data sets filtered and sampled at the storage service 723. In one embodiment, programs used for evaluating logical filtering criteria and/or sampling to obtain disjoint subsets may be executed using the event-driven server-less computing service, as indicated by arrow 781.

Figure 8:
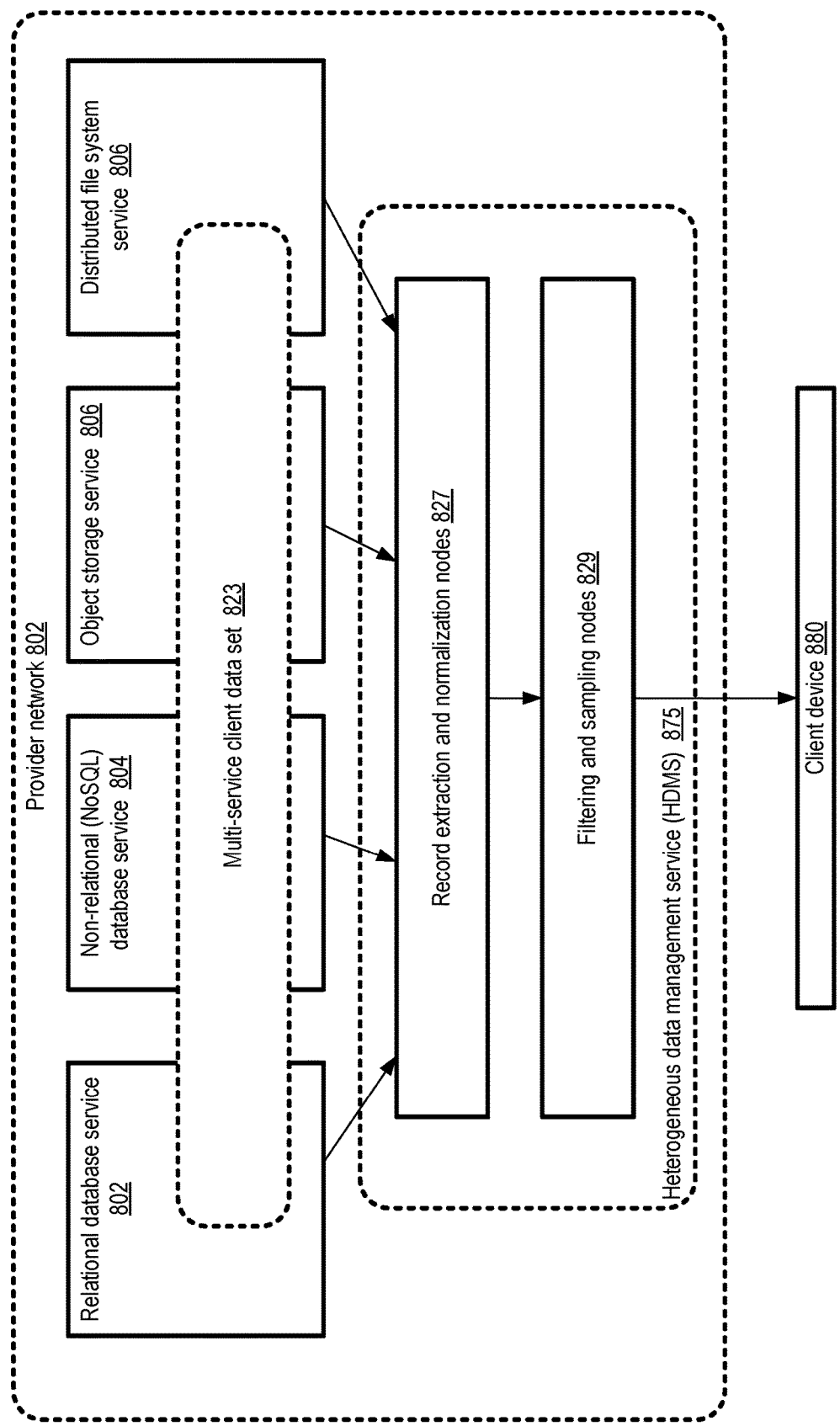
FIG. 8 illustrates an example provider network environment at which disjoint sampling of data sets distributed across a plurality of data stores may be implemented, according to at least some embodiments.

In some cases, respective portions of data sets of a given application may reside at different services or data stores of a provider network. FIG. 8 illustrates an example provider network environment at which disjoint sampling of data sets distributed across a plurality of data stores may be implemented, according to at least some embodiments. As shown, provider network 802 may include a relational database service 802, a non-relational database service 804 (also referred to as a NoSQL service), an object storage service 806 and a distributed file system service 806, and a heterogeneous data management service (HDMS) 875.

A data set 823 may comprise a combination of data items (e.g., tables in the relational and non-relational databases, unstructured objects in the object storage service, files in the distributed file system service) spread among several different services. The client on whose behalf the distributed data set is stored may submit programmatic requests to the HDMS 875 from a client device 880, identifying the individual data items that form the data set, as well as guidance on how data records are to be extracted and/or normalized (converted to a common format) in the depicted embodiment. Records stored at the different underlying services 802, 804, 806 and 808 may be extracted and transformed if needed at record extraction and normalization nodes 827 of the HDMS in some embodiments. In at least one embodiment, logical filtering and sampling techniques similar to those discussed earlier may be implemented at a separate set of nodes 829 of the HDMS 875; in other embodiments, the same set of HDMS nodes may be used for record extraction, normalization, filtering and sampling. The tasks of record extraction, normalization, filtering and/or sampling may be performed in parallel at multiple HDMS nodes in some embodiments. Disjoint subsets of the results of the logical filtering, identified using sub-range identifiers and range mappings generated for the result records, may be transmitted to the client device 880 (and/or other destinations) in the depicted embodiment.

Methods for Providing Parameterized Disjoint Subsets of Data

Figure 9:
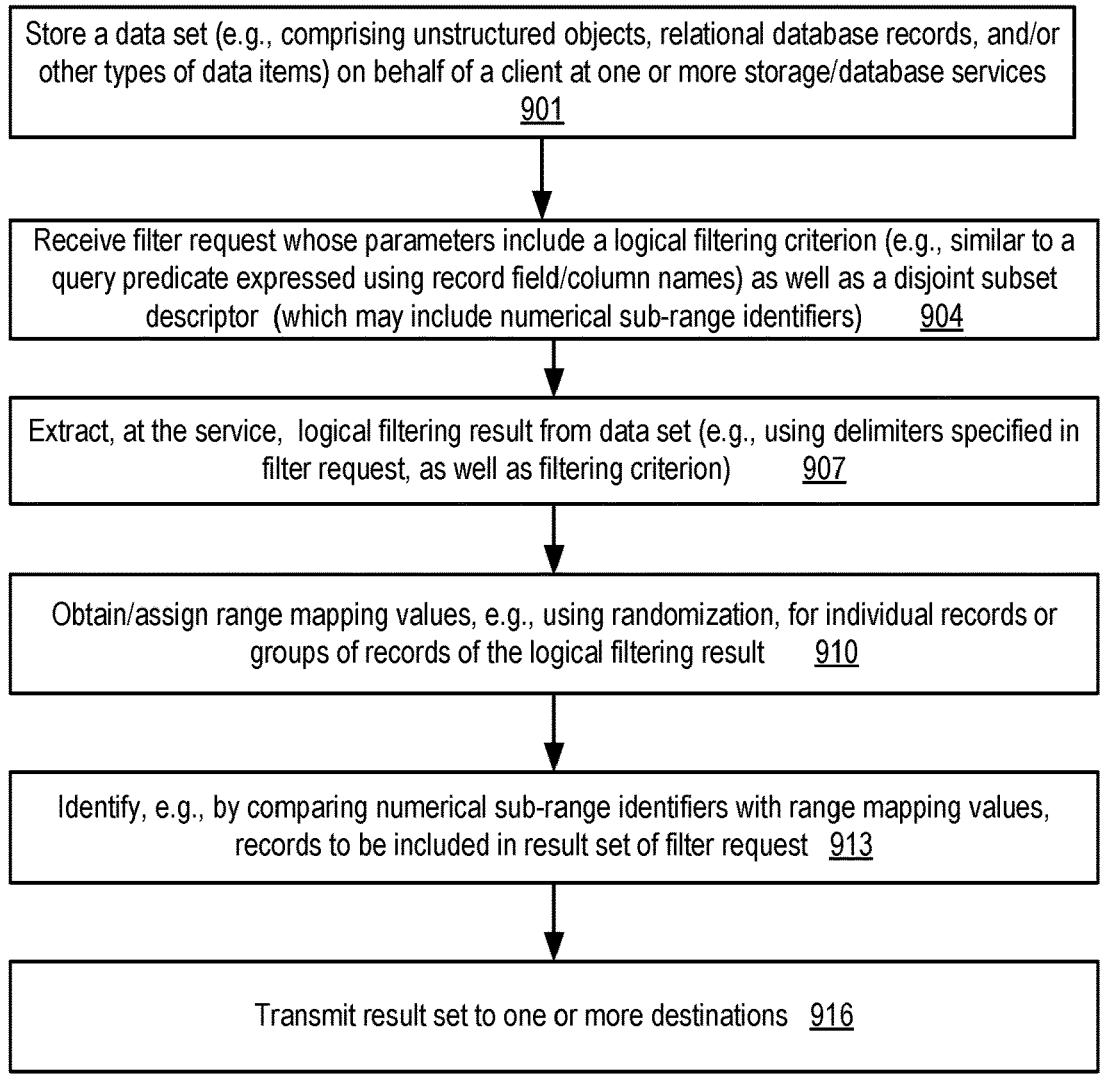
FIG. 9 is a flow diagram illustrating aspects of operations that may be performed to support parameterized disjoint sampling of data sets, according to at least some embodiments.

FIG. 9 is a flow diagram illustrating aspects of operations that may be performed to support parameterized disjoint sampling of data sets, according to at least some embodiments. As shown in element 901, a data set comprising one or more objects or items may be stored at one or more storage services (similar in functionality and features to object storage service 102 of FIG. 1). A wide variety of data models and storage devices may be used for the data set. In some embodiments, at least a portion of the data may be stored in the form of unstructured objects whose internal schema or structure is not provided or revealed in advance to the storage service; in other embodiments database tables (e.g., of a relational or non-relational database management service, or files of a distributed file system, may be used. In some embodiments, a combination of one or more types of storage devices, such as volatile memory, solid state drives, rotating disk-based derives, or archival devices such as tapes may be used for the data set.

As shown in element 904, a filter request for a subset of the data set may be received, e.g., via a programmatic interface. The filter request may include a logical filtering criterion (e.g., expressed as a query predicate or other type of query specification) as well as a disjoint subset descriptor (e.g., expressed as a collection of one or more sub-range identifiers of the kind discussed earlier) in some embodiments. In embodiments in which at least a portion of the data set is stored as an unstructured object, one or more delimiters and/or a schema may be provided to enable the internal structure of the data to be considered in preparing the response to the filter request. In some embodiments, various other parameters (similar to those discussed in the context of FIG. 5 may be included in the filter request, such as a repeatability setting or token, a granularity indicator such as a low-end and a high-end of the sub-range identifiers, seeds for random number generators, and so on. In one embodiment, repeatability of disjoint sampling may be enabled by default, and clients may not need to provide any specific parameters to obtain the same result set for repeated submissions of the same filter request. In at least one embodiment, a client may be able to use repeatability tokens (e.g., a seed for a random number generator) to obtain repeatability in the following way. A client may submit a repeatability token (e.g., an integer or string) RT1 as a parameter of a given filter request FR1. If the client later re-uses RT1 as the repeatability token in another filter request FR2 (with values of other FR2 parameters kept the same as those used for FR1), the same results that were provided for FR1 may also be provided for FR2. If, however, a different repeatability token RT2 is used in FR1 (keeping all other parameters unchanged from FR1), different results may be provided for FR2 than were provided for FR1. In at least one embodiment, a flag or configuration setting may be used for controlling repeatability instead of a token. If, for example, the client on whose behalf the data set is stored wishes to ensure that the same result set is generated for multiple submissions of the same request, an ENABLE_REPEATABILITY setting may be included in some embodiments; if the client wishes to ensure that different result sets are provided for repeated requests, a DISABLE_REPEATABILITY setting may be included. Based on the value chosen for the repeatability setting, the system may generate identical results sets for filter requests with the same query specification and disjoint subset specification, or generate different results for such filter requests. A granularity indicator may notify the storage service of the granularity at which subsets of the data set are to be identified, and the range mapping values (discussed below) for the records of the data set may be generated based at least in part on the indicated granularity in some embodiments. A version or variant of SQL, or SQL-like syntax, may be used to express the disjoint subset descriptor in some embodiments. In one embodiment, instead of specifying a query in SQL, a list-objects request (corresponding to an application programming interface of an object storage service, enabling users to get lists of objects of one or more buckets or object containers) may be specified for the logical filtering.

In various embodiments, a logical filtering result may be extracted from the data set if needed, e.g., using the filtering criterion and/or delimiters indicated by the client (element 907). As mentioned earlier, at least in some embodiments delimiters may not have to be supplied by the client. In some embodiments in which the storage service comprises a filtering subsystem separate from a physical storage subsystem (as shown in FIG. 1), the logical filtering result may be generated at a service-side filtering manager at the filtering subsystem, for example. In some cases, a result of an earlier filter request, cached at the filtering subsystem, may be identified instead of accessing the physical storage subsystem.

In the embodiment depicted in FIG. 9, respective range mapping values may be assigned to individual records of the result of the logical filtering step (element 910). In some cases, one or more pseudo-random numbers may be used to assign such range mapping values, so that, for example, records that are adjacent to one another in the logical filtering results are not necessarily assigned mapping values that are close to one another. In some embodiments, range mapping values may be cached and re-used for multiple filter requests (e.g., multiple requests that with identical logical filtering criteria).

Records to be included in the final result set of the filter request may be identified using the sub-range identifiers and the range mapping values in various embodiments (element 913). In some cases, the range mapping values may be compared to the sub-range identifiers to identify the results—e.g., for a sub-range value of 70 (out of a possible range of 1-100), the records whose range mapping values lie between 0.7 (out of a range from 0 to 1.0) and 0.71 may be selected. The final result set may then be stored and/or sent to one or more destinations (element 916). In at least some embodiments, filter requests with identical logical filtering criteria (e.g., identical query predicates/specifications) but with non-overlapping sub-range indicators may be used to obtain disjoint training subsets and test subsets of the data set, and used to train and test a machine learning model.

It is noted that in various embodiments, some of the operations shown in FIG. FIG. 9 may be implemented in a different order than that shown in the figure, or may be performed in parallel rather than sequentially. For example, in one embodiment the data set may be distributed across multiple data centers of a provider network, and the extraction of the logical filtering result, the generation of the mapping range values and/or other steps may be performed in parallel at multiple data centers. Additionally, some of the operations shown in FIG. 9 may not be required in one or more implementations.

Use Cases

The techniques described above, of generating disjoint subsets of large data sets using resources of network-accessible services before transmitting the results over a network to a destination, may be beneficial in a variety of scenarios. Applications in a variety of problem domains, including finance, health management, security management, scientific analysis and the like are increasingly reliant on complex machine learning models that typically have to be trained and tested using large data sets. To generalize the models, and to evaluate the effectiveness of such models, it is often important that (a) the data used as input at each stage (training vs. testing) be randomized to avoid locality-based skew and (b) overlaps between the data used for training and the data used for testing be avoided. Furthermore, in many cases a given training run and/or a test run may have to be replicated during the process of tuning or debugging a model, and the same input data that was used in the earlier repetitions of training or testing may have to be re-used. By providing easy-to-use interfaces (such as SQL-like interfaces for specifying numeric sub-range identifiers) for data scientists and other users to select non-overlapping subsets of the input data, the techniques described herein may help simplify the tasks of developing high-quality machine learning models and other similar analytics programs.

Illustrative Computer System

Figure 10:
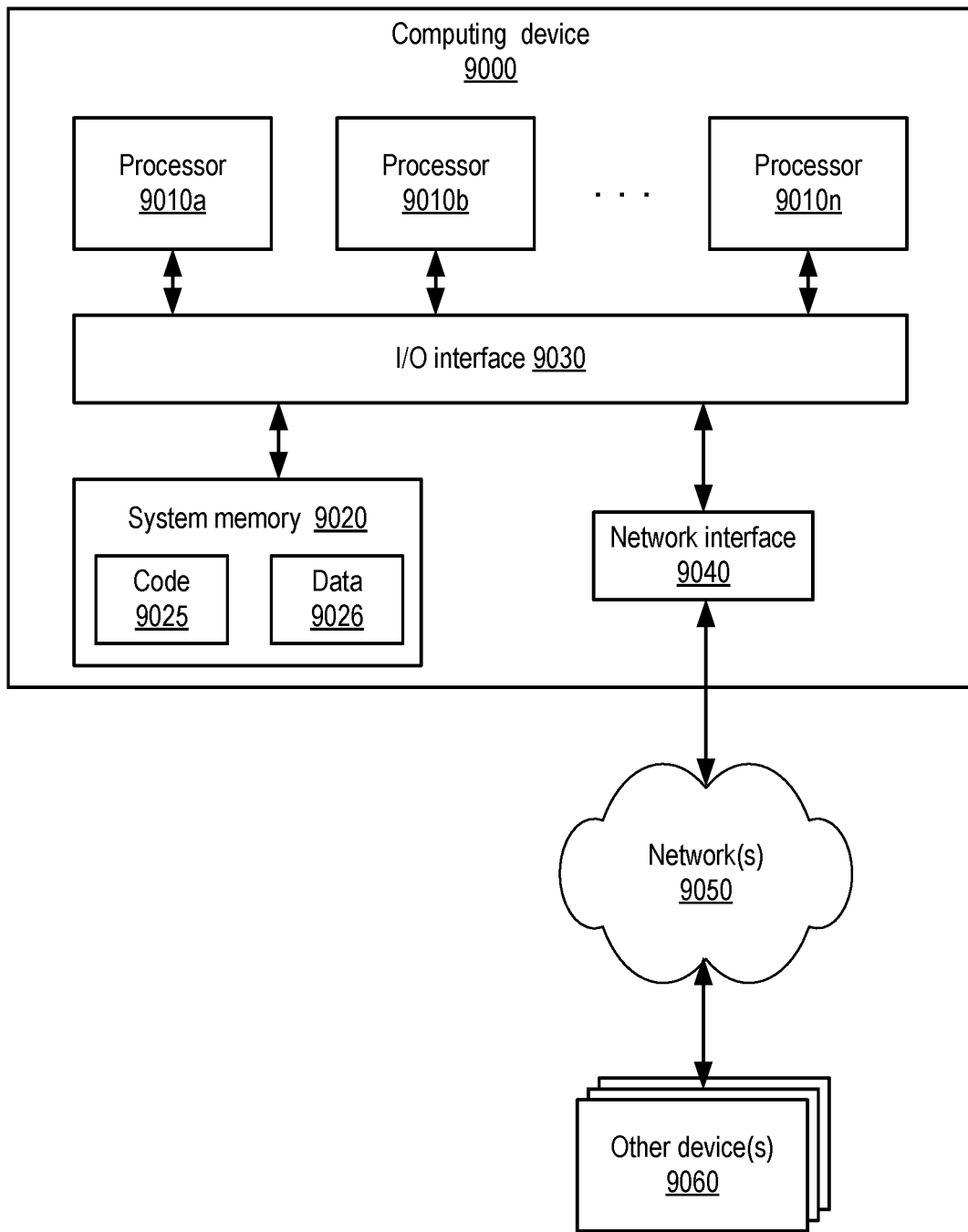
FIG. 10 is a block diagram illustrating an example computing device that may be used in at least some embodiments.

In at least some embodiments, a server that implements a portion or all of one or more of the technologies described herein, including the techniques for implementing nodes of a storage service which provides parameterized disjoint subsets of data sets, as well as other services of a provider network, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
store, at a network-accessible storage service, a data set comprising one or more objects, wherein an indication of the internal structure of individual ones of the objects is not provided to the network-accessible storage service;
receive, via a programmatic interface, a first filter request from a client device for a portion of the data set, wherein the first filter request indicates at least (a) a query predicate and (b) a first disjoint subset descriptor, wherein the first disjoint subset descriptor specifies, with respect to a query result corresponding to the query predicate, one or more sub-range identifiers to be used to identify data records of a targeted fraction of the query result;
extract, at a service-side filtering manager of the network-accessible storage service, based at least in part on the query predicate, a first query result comprising a plurality of data records from the data set;
assign, to individual ones of the plurality of data records, a respective range mapping value using at least one pseudo-random number generator;
identify, from the plurality of data records, based at least in part on the one or more sub-range identifiers and the respective range mapping values, a result set of the first filter request comprising one or more data records; and
transmit, to one or more destinations, the result set.

2. The system as recited in claim 1, wherein the one or more computing devices include further instructions that upon execution on or across one or more processors further cause the one or more computing devices to:
train a machine learning model using a training data set comprising the result set of the first filter request; and
test the machine learning model using a test data set comprising the result of a second filter request directed to the data set, wherein the second filter request comprises (a) the query predicate of the first filter request and (b) a second disjoint subset descriptor, wherein the second disjoint subset descriptor specifies, with respect to the query result corresponding to the query predicate, a sub-range identifier that was not among the one or more sub-range identifiers of the first filter request.

3. The system as recited in claim 1, wherein the first disjoint subset descriptor is expressed in a variant of the Structured Query Language (SQL).

4. The system as recited in claim 1, wherein the one or more computing devices include instructions that upon execution on or across one or more processors cause the one or more computing devices to:
obtain, via a programmatic interface, an indication of a granularity at which subsets of the plurality of data records are to be identified, wherein the range mapping values are generated based at least in part on the granularity.

5. The system as recited in claim 1, wherein the one or more computing devices include instructions that upon execution on or across one or more processors cause the one or more computing devices to:
obtain, via a programmatic interface, an indication of a repeatability setting with respect to one or more filter requests including the first filter request; and
in accordance with the repeatability setting, provide a different result set in response to another filter request which includes the query predicate and the first disjoint subset descriptor.

6. A method, comprising:
performing, at one or more computing devices:
obtaining a first filter request for a portion of a data set, wherein the first filter request indicates at least (a) a query specification and (b) a first disjoint subset descriptor, wherein the first disjoint subset descriptor specifies, with respect to a query result corresponding to the query specification, one or more sub-range indicators;
identifying, corresponding to individual ones of a plurality of data records of a first query result obtained from the data set using the query specification, a respective range mapping value;
selecting, from the plurality of data records, based at least in part on the one or more sub-range indicators and the respective range mapping values, a result set of the first filter request comprising one or more data records; and
providing, to one or more destinations, the result set.

7. The method as recited in claim 6, wherein the first disjoint subset descriptor is expressed in a version or variant of the Structured Query Language (SQL).

8. The method as recited in claim 6, further comprising performing, at the one or more computing devices:
obtaining an indication of a low end and a high end of the sub-range indicators, indicating a granularity at which the plurality of data records are to be classified for inclusion in the result set of the first filter request; and
utilizing the low end and high end to generate the respective range mapping values.

9. The method as recited in claim 6, further comprising performing, at the one or more computing devices:
caching the respective range mapping values; and
re-using the respective range mapping values to respond to another filter request.

10. The method as recited in claim 6, further comprising performing, at the one or more computing devices:
obtaining, via a programmatic interface, an indication of a repeatability setting with respect to one or more filter requests including the first filter request; and in accordance with the repeatability setting, providing a different result in response to another filter request which includes the query specification and the first disjoint subset descriptor.

11. The method as recited in claim 6, wherein the data set is stored at an object storage service comprising a plurality of data buckets, and wherein the query specification indicates that a listing of objects of at least one bucket is to be generated.

12. The method as recited in claim 6, wherein the data set comprises a portion of one or more unstructured objects, and wherein the first filter request comprises an indication of a delimiter to be used to extract the plurality of data records from the one or more unstructured objects.

13. The method as recited in claim 6, wherein the data set comprises a portion of one or more tables of a relational database management system.

14. The method as recited in claim 6, further comprising performing, at the one or more computing devices:
    determining a first collection of range mapping values for a first portion of the data set at a first data center; and
    determining a second collection of range mapping values for a second portion of the data set at a second data center, wherein the first collection does not overlap with the second collection, and wherein at least a portion of the second collection is determined (a) after a portion of the first collection is determined and (b) before the entirety of the first collection is determined.

15. The method as recited in claim 6, further comprising performing, at the one or more computing devices:
    training a machine learning model using a training data set comprising the result set of the first filter request; and
    testing the machine learning model using a test data set comprising the result of a second filter request directed to the data set, wherein the second filter request comprises (a) the query specification of the first filter request and (b) a second disjoint subset descriptor, wherein the second disjoint subset descriptor specifies, with respect to the query result corresponding to the query specification, a sub-range indicator that was not among the one or more sub-range indicators of the first filter request.

16. One or more non-transitory computer-accessible storage media storing program instructions that when executed on or across one or more processors cause one or more computer systems to:
    obtain a first filter request for a portion of a data set, wherein the first filter request indicates at least (a) a query specification and (b) a disjoint subset descriptor, wherein the disjoint subset descriptor specifies, with respect to a query result corresponding to the query specification, one or more sub-range indicators;
    identify, corresponding to individual ones of a plurality of data records of a first query result obtained from the data set using the query specification, a respective range mapping value;
    select, from the plurality of data records, based at least in part on the one or more sub-range indicators and the respective range mapping values, a result set of the filter request comprising one or more data records; and
    transmit, to one or more destinations, the result set.

17. The one or more non-transitory computer-accessible storage media as recited in claim 16, wherein the disjoint subset descriptor is expressed in aversion or variant of the Structured Query Language (SQL).

18. The one or more non-transitory computer-accessible storage media as recited in claim 16, storing further program instructions that when executed on or across one or more processors further cause the one or more computer systems to:
    obtain an indication of a low end and a high end of the sub-range indicators, indicating a granularity at which the plurality of data records are to be classified for inclusion in the result set of the first filter request; and
    utilize the low end and high end to generate the range mapping values.

19. The one or more non-transitory computer-accessible storage media as recited in claim 16, wherein the data set is stored at least in part at a relational database.

20. The one or more non-transitory computer-accessible storage media as recited in claim 16, storing further program instructions that when executed on or across one or more processors further cause the one or more computer systems to:
    obtain, via a programmatic interface, an indication of a repeatability setting with respect to one or more filter requests including the first filter request; and
    in accordance with the repeatability setting, providing the result set in response to another filter request which includes the query specification and the disjoint subset descriptor.

* * * * *